United States Patent
Henry

(10) Patent No.: US 7,445,228 B2
(45) Date of Patent: Nov. 4, 2008

(54) COLLAPSIBLE STRUCTURE SYSTEM

(75) Inventor: Gilles Henry, Boulogne-Billancourt (FR)

(73) Assignee: Royalty Bugaboo S.A.R.L., Luxembourg (LU)

( * ) Notice: Subject to any disclaimer, the term of this patent is extended or adjusted under 35 U.S.C. 154(b) by 94 days.

(21) Appl. No.: 10/542,604

(22) PCT Filed: Jan. 16, 2004

(86) PCT No.: PCT/IB2004/000762

§ 371 (c)(1),
(2), (4) Date: Apr. 6, 2006

(87) PCT Pub. No.: WO2004/065193

PCT Pub. Date: Aug. 5, 2004

(65) Prior Publication Data

US 2006/0208461 A1    Sep. 21, 2006

(30) Foreign Application Priority Data

Jan. 17, 2003   (FR)   ................................... 03 00535

(51) Int. Cl.
  *B62B 1/00*   (2006.01)
  *B62B 3/00*   (2006.01)
(52) U.S. Cl. ........................ 280/639; 280/642; 280/647; 280/650; 280/657
(58) Field of Classification Search ................. 280/642, 280/650, 652, 658, 38, 647, 657, 651, 47.38, 280/47.4, 639; 135/135, 128, 126, 139, 143
See application file for complete search history.

(56) References Cited

U.S. PATENT DOCUMENTS

| | | | | |
|---|---|---|---|---|
| 3,936,069 A | * | 2/1976 | Giordani | 280/650 |
| 4,042,249 A | * | 8/1977 | Kassai | 280/38 |
| 4,077,641 A | * | 3/1978 | Perego | 280/650 |
| 4,152,010 A | * | 5/1979 | Kassai | 280/650 |
| 4,386,790 A | * | 6/1983 | Kassai | 280/650 |
| 6,308,805 B1 | * | 10/2001 | Lan | 280/647 |
| 6,428,034 B1 | * | 8/2002 | Bost | 280/650 |
| 6,877,762 B2 | * | 4/2005 | Yamazaki | 280/647 |
| 6,918,608 B2 | * | 7/2005 | Crisp | 280/642 |

FOREIGN PATENT DOCUMENTS

| | | |
|---|---|---|
| FR | 2167594 | 1/1973 |
| FR | 2 167 594 | 7/1973 |
| FR | 2 259 001 | 1/1975 |
| FR | 2259001 | 1/1975 |
| FR | 2 362 037 | 2/1977 |
| FR | 2 564 405 | 5/1984 |
| FR | 2 566 357 | 6/1984 |
| WO | WO 02/20331 A1 | 3/2002 |

* cited by examiner

*Primary Examiner*—Hau V Phan
(74) *Attorney, Agent, or Firm*—Sughrue Mion, PLLC

(57) ABSTRACT

A collapsible structure including an upright, a sliding block, at least one collapsible leg, and at least one a jointed structure, wherein the jointed structure includes a joint located on the upright or on the sliding block that includes two distinct jointing points, so that a side of a deployment triangle, which is jointed at the distinct jointing points, constitutes a rigid guiding triangle defined by these two distinct jointing points and by a third joint.

14 Claims, 5 Drawing Sheets

COLLAPSIBLE STRUCTURE SYSTEM

BACKGROUND OF THE INVENTION

1. Field of the Invention

This invention relates to a collapsible structure, including but not limited to a pushchair for children, wherein it comprises:

an upright;

a sliding block sliding on the upright along an axis, the sliding block being blocked in rotation around this axis;

at least one collapsible leg, unfolding from a collapsed position near the upright, to an unfolded position distanced from the upright;

a jointed structure for the unfolding of the leg comprising, seen according to a direction different from said axis, a jointed deployment triangle;

this deployment triangle comprising:

a first side attached to the upright between a first joint located on the upright and a second joint located on a point of the sliding block;

a second side jointed on the sliding block by the second joint;

a third side jointed on the upright by the first joint and on the second side by a third joint.

2. Field of the Invention

Such a structure is known from FR 2.259.001. A structure of this type allows a relatively simple unfolding of a collapsible structure, such as a pushchair for children. As a matter of fact, the unfolding of the legs of the pushchair is ensured by a straightforward linear movement of the sliding block along the upright. This type of folding, similar to an umbrella, makes it possible to avoid the inconveniences known to current so-called "umbrella-fold" buggies, in which a plurality of unfolding operations must be performed in order to reach the unfolded position of the structure.

However, the seats of the above-mentioned type are not entirely satisfactory. Indeed, the second and third jointed sides of the deployment triangle of such seats are constituted of simple connecting bars. These connecting bars are respectively linked to the sliding block and to the upright via simple hinges. The rigidity of the structure in the unfolded position is therefore ensured by this set of connecting bars and hinges. Thus, if these hinges are not stiffened, the deployment triangle, and consequently the related leg, would lack circumferential rigidity with respect to the upright. It is then necessary to use complex rigidifying means for the hinges, as for example a mono-block structure equipped with channel shaped supports, integral with the sliding block.

The prior art also includes patent FR 2.167.594, which discloses a collapsible structure that does not have a rigid guiding triangle. The only supposed guiding triangle extends from three points respectively linking (i) a point located at the lowest end of the L-shaped backbone (defining the linear unfolding axis of the pushchair), (ii) a point on the horizontal portion of the L-shaped backbone, and finally (iii) a point on the support for one of the rear wheels. In this structure, there is an obligation that one of the segments constituting the said triangle is non-rigid, or flexible, as one of the points constituting the vertices of the triangle is not on the rotation axis of the triangle segment opposite to such point. As appears in FIG. 3, such flexibility could be provided by an additional line hinge close to the ball hinge in the corner. Thus, this guiding triangle does in no way constitute a rigid structure.

The main purpose of the invention is to resolve this inconvenience, by providing an easily collapsible structure, which is rigidified in the unfolded position via simple, inexpensive and light means.

SUMMARY OF THE INVENTION

For this purpose, the invention relates to a collapsible structure of the above-mentioned type, wherein the first joint or the second joint comprises two separated points of joint according to said direction, so that the side of the deployment triangle which is jointed at these points constitutes a rigid guiding triangle, defined by these two points and by the third joint.

The structure according to the invention could have one or more of the following characteristics, taken alone or according to all the possible technical combinations:

the rigid guiding triangle comprises three side members, wherein one of said side members coincides with the hinge axis, and wherein the other two side members are fixed with respect to each other.

the surface delimited by the vertices of the guiding triangle is a solid surface, such as a plate;

the surface delimited by the vertices of the guiding triangle is a cut-out surface;

the leg is integral with the second side of the deployment triangle;

the leg is jointed to the third side of the deployment triangle or to an extension of the said side, and a supporting part is jointed between, (i) the sliding block, and (ii) an intermediary point of the leg;

in the unfolded position, the supporting part rests on a part of the guiding triangle;

it comprises at least two collapsible legs, and retractable rigidifying means, jointed on the two legs and unfolding through the action of a connecting support jointed at the sliding block;

the rigidifying means, in the unfolded position, are adapted to support a pushchair seat and/or serve as a footrest;

the sliding block is adapted to support a pushchair backrest;

said direction is inclined compared to the horizontal, and said direction makes with said axis an angle less than 90°;

it comprises for each leg a jointed structure such as defined by one or more of the above mentioned characteristics.

BRIEF DESCRIPTION OF THE DRAWINGS

Advantageously, one or more of the rods (9) is/are equipped with a spring mechanism, linking the sliding block (3) to the central upright (1), so that the unfolding of the structure, or its collapsing, is done automatically, via simple unlocking of the sliding block (3).

Exemplary embodiments will now be described in relation to the annexed drawings, in which:

FIG. 1 illustrates the unfolding of the two rear legs of a self-carrying pushchair, adapted to support and transport a child.

Figure 1:
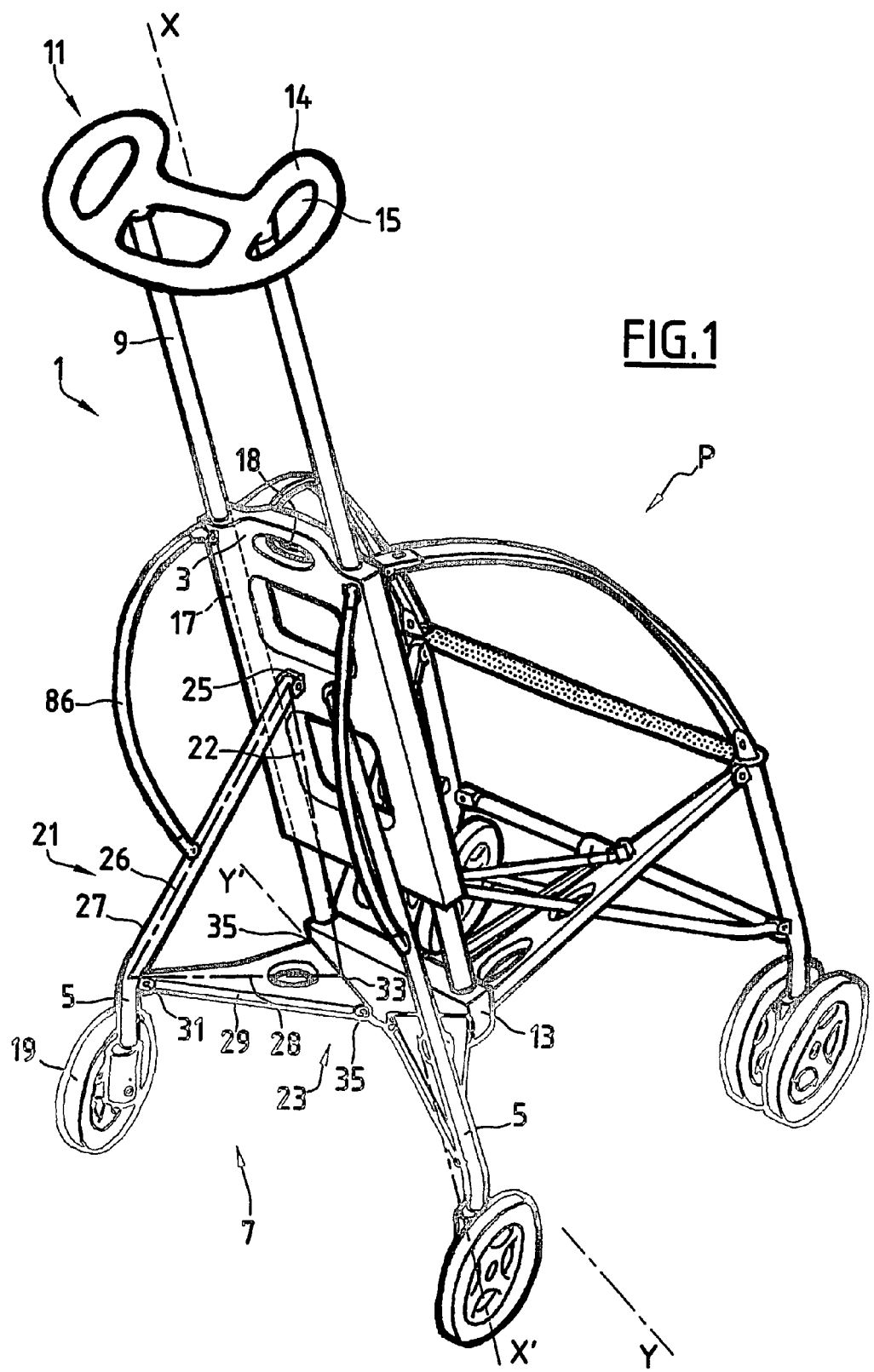
FIG. 1 is a perspective view of a first structure of a seat according to the invention in the unfolded position, fitted to the rear side of a pushchair.

This pushchair comprises a central upright 1, a sliding block 3, sliding on the central upright 1 along an axis X-X', two collapsible legs 5 and a jointed structure 7 for the simultaneous unfolding of these legs.

The central upright 1 comprises two rods 9 parallel to the axis X-X'. These rods 9 are held in place (i) at their upper end, by a steering wheel 11 and (ii) at their lower end, by a supporting part 13.

The steering wheel 11 comprises a part 14 of substantially ovoid shape. This part 14 is equipped with three openings 15 which make it possible to easily guide the pushchair, notably with only one hand.

The sliding block 3 comprises an extended part in relation to axis X-X', drilled with two central holes 17 parallel to axis X-X'. The rods 9 of the central upright 1 slot into the holes 17 of the sliding block 3. Thus, the sliding block 3 can freely slide along the rods 9 of the central upright 1 between the steering wheel 11 and the supporting part 13.

The sliding block 3 is moreover equipped with locking means 18, made of for example a friction brake or a latch mechanism. These locking means 18 make it possible to block the sliding block 3 in a position close any one of the far ends of its stroke along the rods 9 of the central upright 1.

DETAILED DESCRIPTION OF THE EXEMPLARY EMBODIMENTS

Additionally, the two rods 9 make it possible to lock the sliding block 3 in rotation around the sliding axis X-X'.

As illustrated in FIG. 1, the axis X-X' is slightly inclined in relation to the vertical, when the pushchair is resting on the ground in the unfolded position.

Each rear leg 5 of the pushchair represented in FIG. 1 is equipped with a wheel 19, and its collapsible structure 7.

This collapsible structure 7 comprises, seen according to a direction Y-Y' different from the axis X-X', a first jointed deployment triangle 21. The triangle 21 is outlined by a chain dotted line in FIG. 1.

The first side 22 of the deployment triangle 21 is attached to the central upright 1. It is delimited by a first joint 23 positioned on the supporting part 13 and by a second joint 25 positioned on the sliding block 3.

The deployment triangle 21 comprises a second side 26 created by a connecting bar 27 jointed on the sliding block 5 by the second joint 25.

The third side 28 of the deployment triangle is constituted by a rigid plate 29, jointed on the supporting part 13 by a first joint 23 and jointed by a third joint 31 on the outside of the connecting bar 27 facing the second joint 25.

This rigid plate 29 is substantially triangular in shape. It is cut out so as to reduce the weight of the structure.

The first joint 23, connecting the supporting part 13 and the rigid plate 29, comprises a hinge 33 extending longitudinally along the axis Y-Y', according to a slightly inclined direction in relation to the horizontal when the pushchair is resting on the ground in the unfolded position.

Moreover, the axis Y-Y' makes with the axis X-X' an angle less than 90°, so as to allow the radial deployment of the legs 5 in relation to the axis X-X' during the unfolding of the pushchair.

This hinge 33 comprises two jointing points 35 separated according to the direction Y-Y'. These points 35 are located close to the two vertices of the rigid plate 29. The third joint 31 is located close to the third vertex of the plate 29.

In this first embodiment of the structure 7, the leg 5 is integral to the end of the connecting bar 27 representing the second side 26 of the deployment triangle 21.

We will now describe an exemplary unfolding of the structure 7, from a collapsed position to the unfolded position represented in FIG. 1.

Initially, the sliding block 3 is fixed in the high position close to the steering wheel 11 via locking means 18.

In this position, the connecting bar 27 creating the second side 26 of the deployment triangle 21 and the rigid plate 29 creating the third side 28 of the deployment triangle 21, are positioned substantially parallel to the axis X-X' of the central upright 1.

Consequently, in this position, the deployment triangle 21 is flattened. The leg 5 fixed to the extension of the connecting bar 27 is in the collapsed position, close to the central upright 1.

In order to unfold the rear legs of the pushchair, the locking means 18 are released. The sliding block 3 is therefore pushed along the axis X-X' towards the supporting part 13. The distance between the first joint 23 and the second joint 25 decreases as the displacement progresses. Consequently, the difference between (i) the angle of the first side 22 with the second side 26 of the deployment triangle 21, and (ii) the angle of the first side 22 with the third side 28 of the deployment triangle 21, increases substantially. The vertex of the deployment triangle located near the third joint 31 moves away from the central upright 1. During this movement, the leg 5, fixed to the extension of the connecting bar 27, is distanced from the central upright 1.

When the sliding block 3 reaches its lower position near the supporting part 13, or in contact with the latter, the locking means 18 are activated and the leg 5 is blocked in the unfolded position.

In this position, the rigid plate 29 ensures the supporting of the deployment triangle 21 of the leg 5, as well as its circumferential rigidity in relation to the movement axis X-X' of the sliding block.

A second structure 7A according to the invention represented in FIGS. 2 to 5, allows for the deployment of each of the front legs 5A of the pushchair. This structure 7A is different from the structure 7 described above due to the following points.

Figure 2:
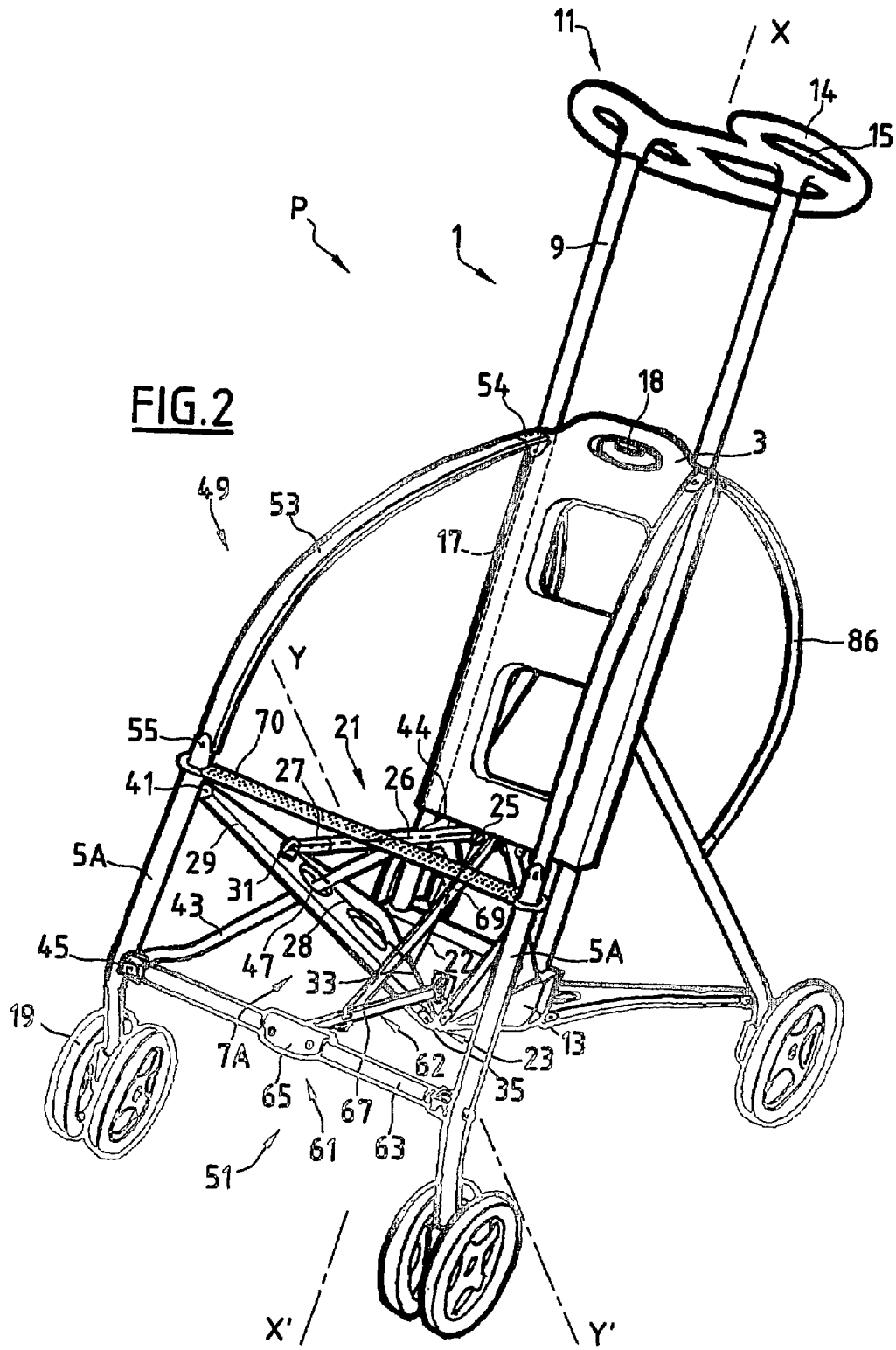
FIG. 2 is a perspective view of a second structure of a seat according to the invention, in the unfolded position, fitted to the front side of a pushchair.

As illustrated in FIG. 2, the third joint 31 between the connecting bar 27 of the second side of the deployment triangle 21 and the rigid plate 29, is placed on an intermediary point of the rigid plate 29.

Moreover, the leg 5A is jointed at the rigid plate 29 by means of a fourth joint 41 located close to the vertex of the rigid plate 29.

The collapsible structure 7A corresponding to each leg 5A further comprises a supporting part 43 constituted of a second connecting bar, which is jointed, on one hand, by a point 44 of the sliding block 3 and, on the other hand, by an intermediary point 45 of the leg 5A located below the joint 41. As illustrated in FIG. 2, the supporting part 43 passes through a hole 47 in the rigid plate 29.

This structure 7A makes a pseudo-parallelogram which has as its vertices (i) the fourth joint 41 and the intermediary point 45 of the leg 5A and (ii) the point 44 of the sliding block 3 and the middle of the hinge 33.

Differing from the first structure 7, this structure 7A further comprises supporting means 49 for a collapsible safety structure, and retractable rigidifying means 51.

Figure 3:
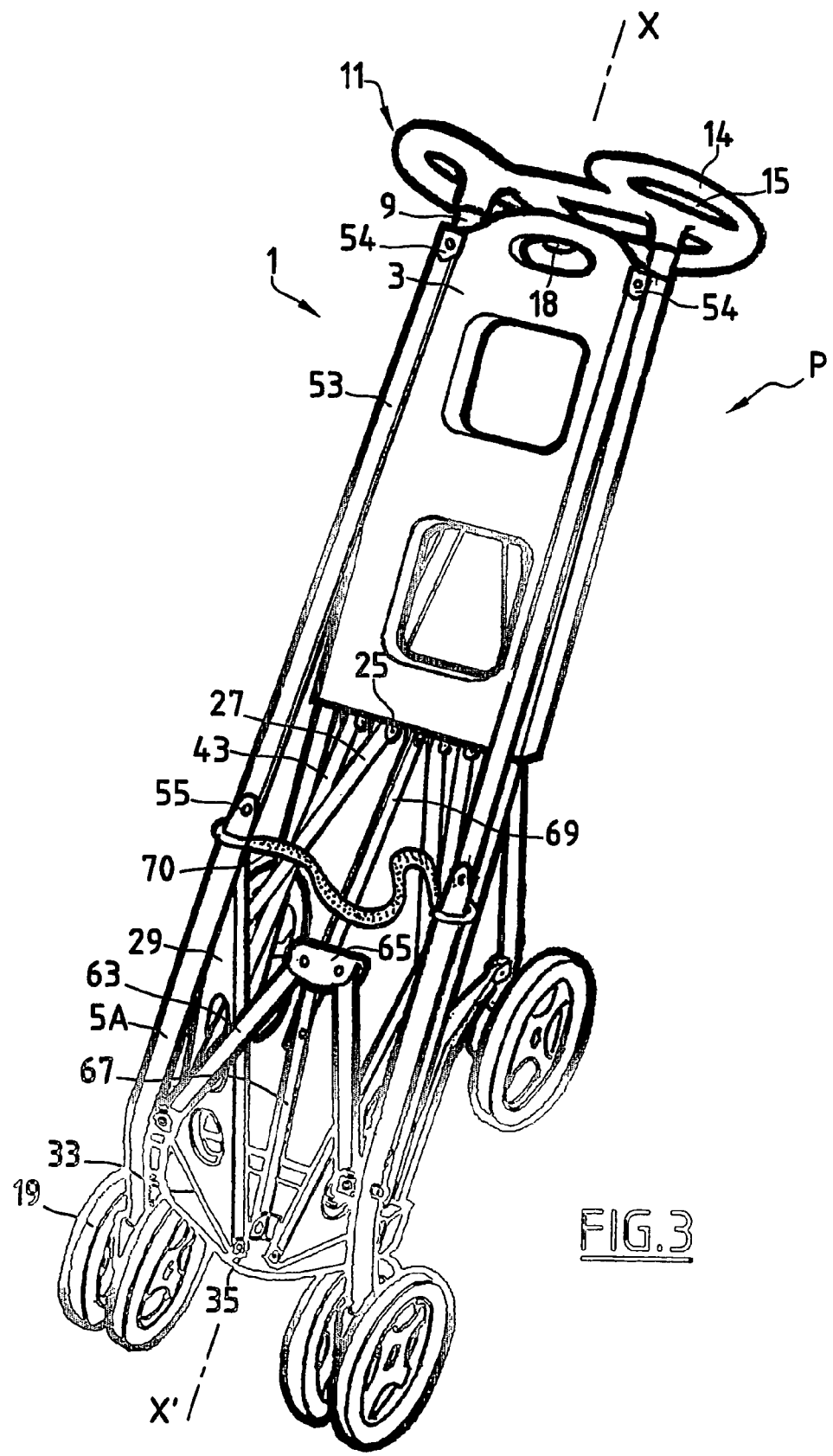
FIG. 3 is a similar view to that of FIG. 2, in which the structure is in the collapsed position.

The supporting means 49 comprise for each leg 5A a blade 53 in an elongated form, made of flexible material. This flexible blade 53 is fixed, on one hand, to a first point 54 on the upper part of the sliding block 3 and, on the other hand, to a second point 55 at the upper end of the leg 5A, close to the jointing point 41 between the leg 5A and the plate 39. The length of the flexible blade 53 is substantially equal to the distance separating its two fixation points when the sliding block 3 is positioned close to the steering wheel 11. Thus, when the pushchair is collapsed, the flexible blade 53 is close to the central upright 1, in a rectilinear position, substantially parallel to the axis X-X', as illustrated in FIG. 3.

As illustrated in FIG. 2, the rigidifying means 51 comprise a collapsible rod 61 and a central connection part 62.

This collapsible rod 61 comprises two arms 63 linked together by a hinge 65 close to a first end. The opposite end to the hinge 65 of each of the arms 63 is respectively jointed on the two facing legs 5A. The jointing points of the collapsible rod 61 to the legs 5A are located close to the wheels 19 and define a horizontal and transversal direction when the pushchair is resting on the ground in the unfolded position.

The linking device 62 comprises a pair of compasses constituted of two jointed blades 67 and 69. The first blade 67 is jointed (i) to the central hinge 65 of the collapsible rod 61 and (ii) to the supporting part 13. The second blade 69 is jointed, at one end, to an intermediary point of the first blade 67, and at its other end, to the sliding block 3.

The operating of the second structure 7A is similar to the operating of the first structure 7, with the differences indicated hereafter.

The movement of the sliding block 3 towards the supporting part 13 drives the movement of the leg 5A away from the central upright 1 through the action of the deployment triangle 21. During this movement, the pseudo-parallelogram shape of the structure 7A allows the axis of the leg 5A to be held substantially parallel to the axis X-X', which is favourable to the mechanical resistance of the deployed leg.

In the unfolded position, the supporting part 43 comes in thrust block against the edge of the hole 47, in order to increase the rigidity of the structure.

The geometry of the structure 7A makes it possible to obtain a ratio between (i) the lateral misalignment compared to the axis X-X' of the joint point 41 between the leg 5A and the plate 39 and (ii) the stroke length of the sliding block 3 between the steering wheel 11 and the supporting part 13, that is less than 1. When unfolding the pushchair, the distance which separates the fixing points of the flexible blade 53 when the sliding block 3 is close to the supporting part 13 is shorter than the distance which separates these points when the sliding block 3 is close to the steering wheel 11. The ratio of these two distances is typically comprised between 0.85 and 0.95, preferably between 0.88 and 0.92.

Thus, when the pushchair is unfolded, the flexible blades 53 adopt a significantly bent buckled position, as illustrated in FIG. 2. This position allows the unfolding of a safety structure supported by the flexible blades 53, as described hereinafter.

Moreover, differing from the first structure 7, and as illustrated in FIG. 3, the collapsible rod 61 is in a collapsed position in the initial state. The movement of the sliding block 3 towards the supporting part 13 drives the movement of the joint between the two blades 67 and 69 of the linking device 62 away from the central upright 1. Consequently, the first blade 67 of the linking device 62 drives the movement of the central hinge 65 of the collapsible rod 61 away from the central upright 1. When the sliding block 3 comes close to or in contact with the supporting part 13, the collapsible rod 61 is unfolded and strengthens the circumferential rigidity of the two legs 5 in relation to the axis X-X', so that a stiff frame structure is obtained.

In this position, the collapsible rod 61 is adapted for the feet of a child to rest on. Moreover, a strap 70 is fixed between the two legs 5A, parallel to the first collapsible rod 61, allowing the supporting of a pushchair seat.

Figure 4:
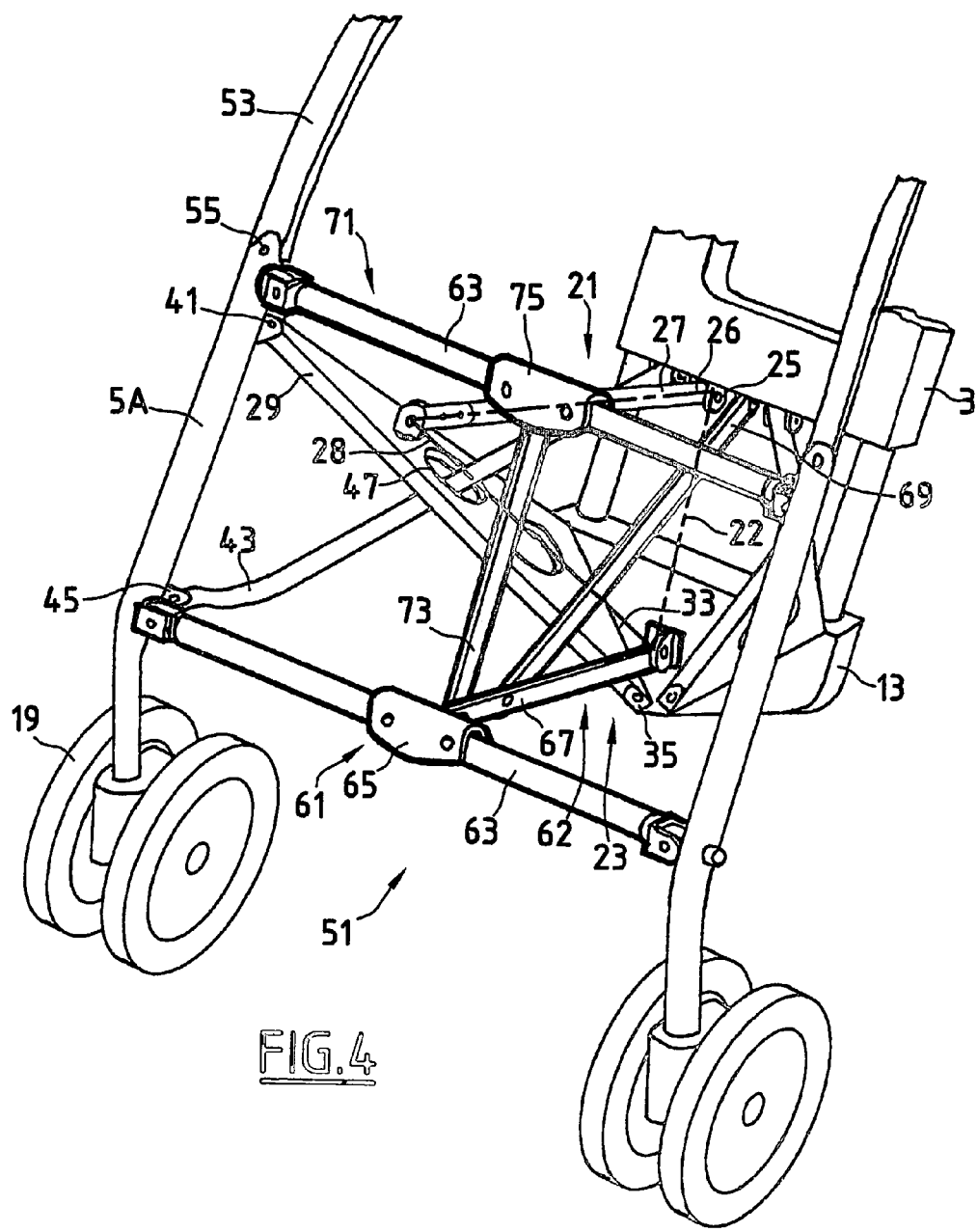
FIG. 4 is a detailed view of the rigidifying means in the unfolded position of the second structure.

Alternatively, as illustrated in FIG. 4, a second collapsible rod 71 similar to the rod 61 can be jointed at the legs 5 parallel to the first collapsible rod 61. The linking device 62 thus comprises a third rod 73 jointed (i) on the central hinge 75 of the second collapsible rod 71 and (ii) on an intermediary point of the first blade 67 of the linking device 62, or directly on the hinge 65.

Moreover, the deployment of this second collapsible rod 71 is identical to the deployment of the first collapsible rod 61. In the unfolded position, this second collapsible rod 71 is adapted to support a pushchair seat.

In another alternative (non represented), it is possible to make the structure lighter by replacing the rigid plate 29 by a two-armed fork. In this case, the two jointing points 35 are placed close to the ends facing the two arms, and the third joint 31 is placed close to the common end of the two arms of the fork.

On the contrary, when rigidity is preferred to lightness, the rigid plate 29 can be solid, so that the surface delimited by the two jointing points 35 and the third joint 31 is solid, with the possible exception of the hole 47 through which the supporting part 43 passes.

Finally, in another alternative (non represented), the second side of the deployment triangle is made by a rigid plate jointed to the sliding block. In this case, the third side of the deployment triangle is made up of a simple connecting bar, linking the supporting part to the rigid plate.

Figure 5:
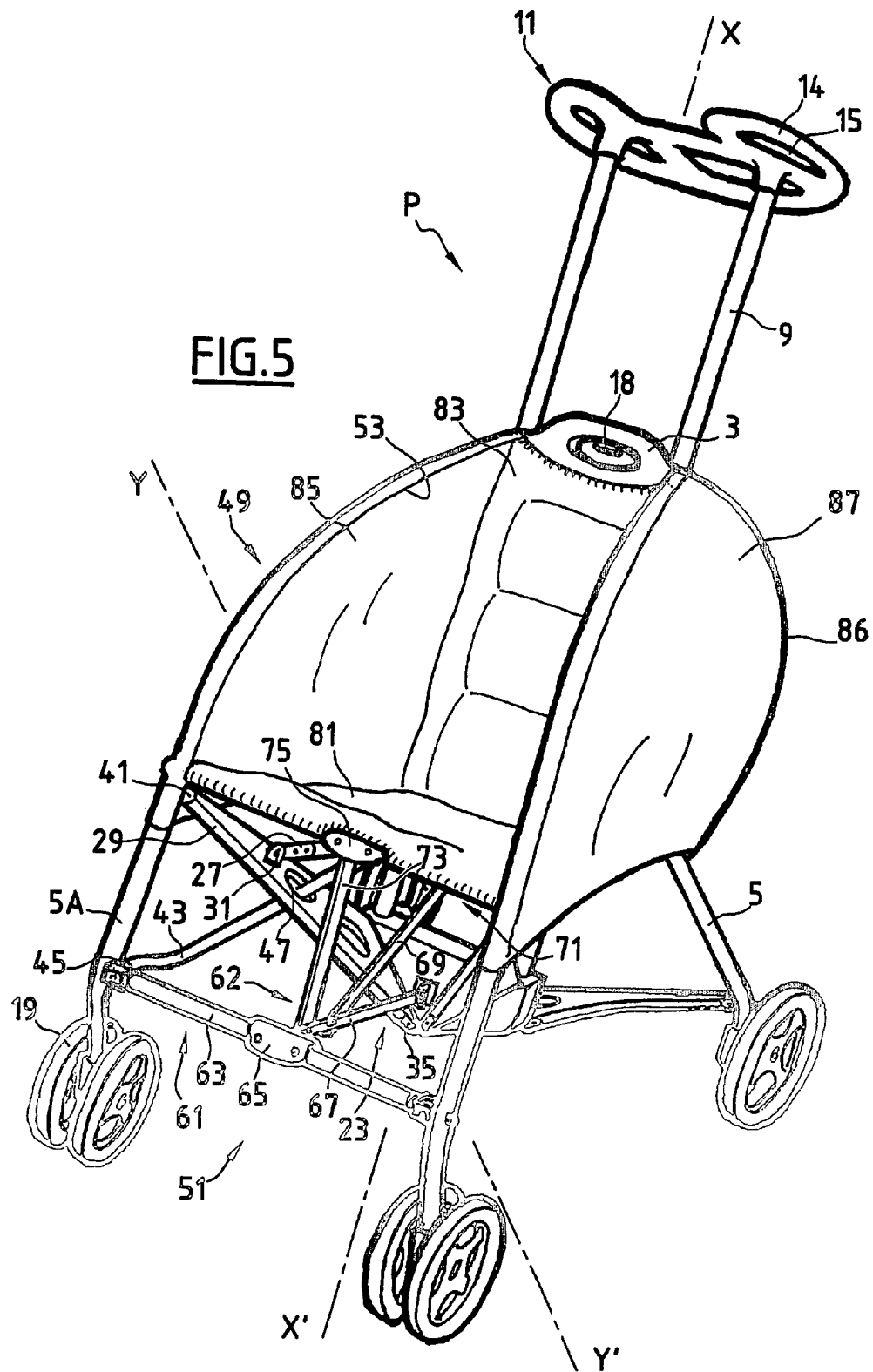
FIG. 5 is a front perspective view of the pushchair equipped with a protective covering.

FIG. 5 represents the self-carrying pushchair according to the alternative in FIG. 4, equipped with a seat 81. The latter is supported by (i) the second collapsible rod 71 and (ii) fixing means (non represented) on the sliding block 3.

Moreover, the backrest 83 of the pushchair is fixed onto the sliding block 3. A protective covering 85 for the child is supported by the two flexible blades 53, and by two similar flexible blades 86, fitted between the top of the sliding block 3 and the rear legs 5. The covering 85 comprises two side covers 87, each of which is fixed along the corresponding blades 53 and 86. A rear cover (non represented) is fixed between the blades 86 to complete the protection of the child. Alternatively, accessories such as a front, fold-away and removable, protection hood or a storage structure can be fixed to the pushchair.

In another alternative (non represented), it is possible to add a spring mechanism onto one or more of the rods 9, and linking the sliding block 3 to the central upright 1, so that the unfolding of the structure (or, on the contrary, its collapsing) is done automatically, by simply unlocking the sliding block 3.

Thanks to the invention which has just been disclosed, it is possible to have a structure which has an easily collapsible structure. This structure also has the advantage of ensuring, in the unfolded position, the circumferential rigidity of the leg bearing the wheel (in the case of a pushchair), using easy to implement, inexpensive and light means.

The central steering wheel 14 is easily adapted to such a structure and makes it possible to easily manoeuvre a self-carrying pushchair.

This type of system can be easily adapted to other types of structures, including but not limited to twin strollers, toy pushchairs, high-chairs, fold-away chairs, wheelchairs for physically impaired people, or other self-carrying trolleys, e.g. golf carts.

The invention claimed is:

1. A collapsible structure, comprising:
   an upright;
   a sliding block sliding on the upright along an axis (X-X'), of the upright such that the sliding block does not rotate around the axis;
   at least one collapsible leg unfolding from a collapsed position near the upright to an unfolded position distanced from the upright;
   at least one jointed structure for the unfolding of the at least one collapsible leg comprising, a jointed deployment triangle, the deployment triangle comprising:
      a first side attached to the upright between a first joint located on the upright and a second joint located on the sliding block;
      a second side jointed on the sliding block by the second joint;
      a third side jointed on the upright by the first joint and on the second side by a third joint;
   wherein the first joint or the second joint comprises two distinct jointing points, so that the side of the side of the deployment triangle which is jointed at the two distinct points constitutes a rigid guiding triangle, defined by these two points and by the third joint.

2. A structure according to claim 1, wherein the rigid guiding triangle comprises three side members, wherein one of said side members coincides with the hinge axis according to a direction (Y-Y') of the rigid guiding triangle and wherein the other two side members are fixed with respect to each other.

3. A structure according to claim 2, wherein said direction (Y-Y') is inclined compared to the horizontal, and said direction (Y-Y') makes with said axis (X-X') an angle of less than 90°.

4. A structure according to claim 1, wherein the surface delimited by the vertices of the guiding triangle is a solid surface.

5. The structure according to claim 4, wherein the solid surface is a plate.

6. A structure according to claim 1, wherein the surface delimited by the vertices of the guiding triangle is a cut-out surface.

7. A structure according to claim 1, wherein the leg is integral to the second side of the deployment triangle.

8. A structure according to claim 1, wherein the leg is jointed to the third side of the deployment triangle or at an extension of this side, and wherein a supporting part is jointed between (i) the sliding block and (ii) an intermediary point of the leg.

9. A structure according to claim 8, wherein, in the unfolded position, the supporting part rests on part of the guiding triangle.

10. A structure according to claim 1, wherein the at least one collapsible leg comprises two collapsible legs, wherein the structure further comprises retractable means for providing rigidity that joins, the two legs, and the structure is collapsible through the action of a connection support jointed to the sliding block.

11. A structure according to claim 10, wherein the means for providing rigidity, in the unfolded position, are adapted to one of: support a pushchair seat or serve as a footrest.

12. A structure according to claim 10, wherein the sliding block is adapted to support a pushchair backrest.

13. A structure according to claim 1, wherein one or more of the rods is/are equipped with a spring mechanism, linking the sliding block to the central upright, so that the unfolding of the structure, or its collapsing, is done automatically, by simple unlocking of the sliding block.

14. The structure according to claim 1, wherein the at least one collapsible leg comprises a plurality of collapsible legs, and the at least one jointed structure comprising a plurality of jointing structures.

* * * * *